Patented Nov. 18, 1952

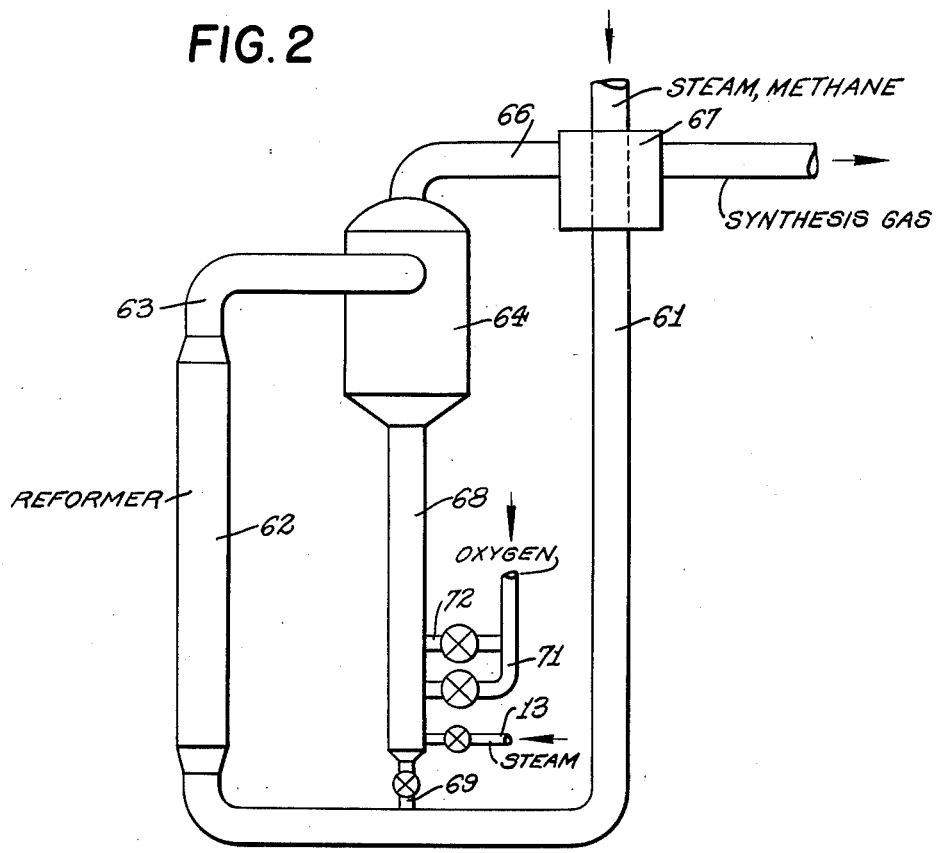

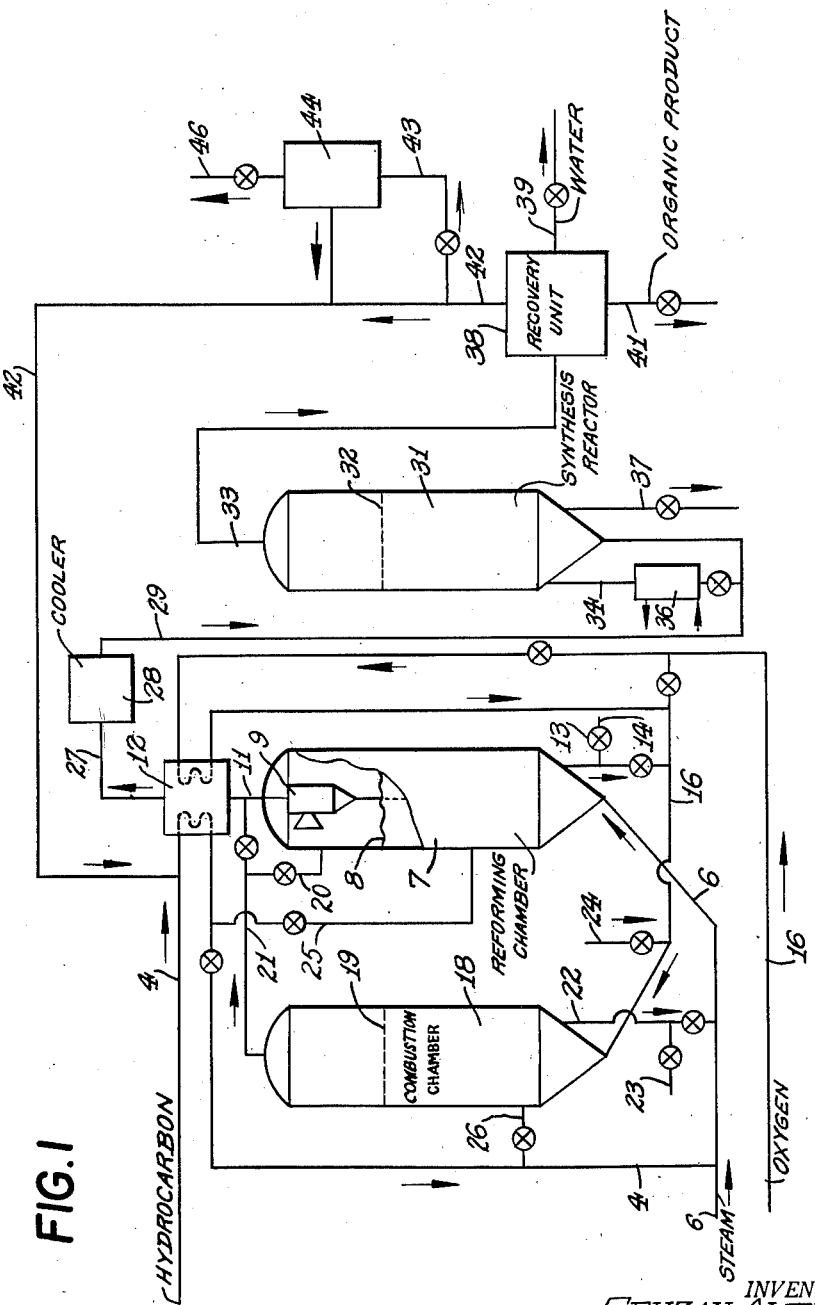

2,618,542

UNITED STATES PATENT OFFICE 2,618,542

MANUFACTURE OF A GASEOUS MIXTURE RICH IN HYDROGEN

Cruzan Alexander, Jackson Heights, N. Y., and George H. Palmer, Fanwood, N. J., assignors to The M. W. Kellogg Company, Jersey City, N. J., a corporation of Delaware Application February 27, 1948, Serial No. 11,474

7 Claims. (Cl. 48—196)

This invention relates to the manufacture of a gaseous mixture rich in hydrogen. In one of its particular aspects, this invention relates to a method for the manufacture of hydrogen and carbon monoxide from hydrocarbons. In another aspect this invention relates to a process for the synthesis of normally liquid organic compounds from normally gaseous and liquid hydrocarbons.

It has been known for some time that hydrogen and carbon monoxide can be produced by the reaction of hydrocarbons with steam and/or carbon dioxide.

In the production of mixtures of hydrogen and carbon monoxide by reaction of steam with hydrocarbons these reactants are contacted at elevated temperatures between about 1250 and about 2400° F. Carbon dioxide may be added to the reaction mixture in order to decrease the hydrogen to carbon monoxide ratio in the gaseous product and in order to utilize carbon dioxide in the generation of the gaseous product. The process may be carried out with or without the presence of a contact material which exerts a catalytic effect on the reaction. In prior processes the reaction has been carried out in conventional reforming furnaces using banks of tubes through which the reactants flow and in which they are heated by indirect heat exchange with a burning fuel in the furnace. Such gaseous mixtures containing hydrogen and carbon monoxide are useful as a source of hydrogen, as fuel, and as a feed gas for the synthesis of organic compounds. This invention has particular applicability to the synthesis of organic compounds. The synthesis of organic compounds from a gaseous mixture containing hydrogen and carbon monoxide in relatively large proportions is effected in the presence of a catalyst, such as a metal or metal oxide of group VIII of the periodic table, at elevated temperatures and relatively high superatmospheric pressures. Generally, the mol ratio of hydrogen to carbon monoxide for the synthesis reaction for maximum production of normally liquid organic compounds is between about 1:1 and about 3:1, normally a ratio of about 2:1.

The selection of reaction conditions and the proportion of reactants for producing gaseous mixtures of hydrogen and carbon monoxide has been governed largely by the necessity for avoiding conversion of the hydrocarbons to carbon and for maintaining the carbon monoxide to carbon dioxide ratio in the product gas at a suitable value, and by mechanical limitations of the equipment. In treating any hydrocarbon or mixture of hydrocarbon and carbon dioxide, it is necessary to supply steam in a mol ratio in excess of the theoretical required to convert all the hydrocarbon, in order to prevent the formation of carbon which has its obvious disadvantages. The lower the temperature in the range of operable temperatures at which the reaction is carried out, the greater is the excess of steam over the theoretical which is required to prevent the formation of carbon. Aside from the cost of operating the process attributable to the use of a large excess of steam, a high steam to hydrocarbon ratio promotes the conversion of the hydrocarbon to carbon dioxide. The production of carbon dioxide decreases the production of carbon monoxide and requires the removal, in most instances, of the carbon dioxide from the product gases. Therefore, in order to minimize the amount of steam necessary in the process to prevent carbon formation it has been customary to operate at a relatively high temperature. This represents a compromise, since the high temperature increases operating costs and limits the operating pressure, usually below about 100 pounds per square inch gage, because of the mechanical limitations of the construction materials at the high temperature. While any hydrocarbon may be converted to carbon monoxide and hydrogen by reaction with steam, carbon forms more readily in the reaction of hydrocarbons having less than the maximum ratio of hydrogen to carbon in the molecule. Consequently, the prior process has been limited practically to the treatment of hydrocarbon mixtures consisting entirely or principally of methane which produces a gaseous product having a mol ratio of hydrogen to carbon monoxide greater than about 2:1.

When the reforming of methane is integrated into a synthesis process for supplying the feed gas thereto, the low pressure necessary in the reforming operation lowers the efficiency of the integrated process as it is necessary to compress the reformed product to the synthesis pressure and to depressure recycle gases of the synthesis reaction being returned to the reforming furnace.

It is much to be desired, therefore, to provide a method and apparatus for overcoming the above inherent difficulties and limitations of the conventional reforming process, particularly when it is used as a source of feed gas for the synthesis of organic compounds.

An object of this invention is to provide a flexible hydrocarbon reforming process.

Another object of this invention is to provide a process for the production of a gaseous mixture comprising hydrogen, carbon dioxide, and carbon monoxide having a maximum ratio of carbon monoxide to carbon dioxide.

Still another object of this invention is to maintain the steam requirements of a methane reforming process at a minimum.

Another object of this invention is to provide a process for the reforming of methane at relatively high pressures and at relatively low temperatures in the range of operable conditions.

Yet another object of this invention is to provide a process for the reforming of hydrocarbons of substantially greater molecular weight than methane with steam to produce hydrogen and carbon monoxide.

Still another object of this invention is to provide an integrated process for the reforming of hydrocarbons to produce hydrogen and carbon monoxide and the subsequent interaction of the hydrogen and carbon monoxide to produce normally liquid organic compounds of greater economic value than the original hydrocarbons.

Various other objects and advantages of the present invention will become apparent to those skilled in the art from the following description and disclosure.

In accordance with the improved process of this invention, hydrocarbon and steam, and any available carbon dioxide, are reacted in the presence of a circulating mass of finely divided contact material which may exert a catalytic effect on the reaction. The mol ratio of steam to hydrocarbon charged to the reaction zone is maintained at a low value whereby the conversion of hydrocarbon to carbon dioxide is substantially minimized and the carbon monoxide to carbon dioxide ratio in the product gas is relatively high. At relatively low operating temperatures the ratio of steam to hydrocarbon in the charge gas may be either above or below the theoretical minimum required for the conversion of all the hydrocarbon to carbon monoxide, while at relatively high operating temperatures the ratio of steam to hydrocarbon charged to the reaction zone ordinarily will be below the theoretical required ratio.

These conditions of operation result in the conversion of a portion of the hydrocarbon to carbon and hydrogen, the carbon being deposited on or admixed with the circulating finely divided contact material. The finely divided contact material, having associated therewith the carbon formed in the reaction zone, is separated from the reaction product gas and passed to a separate second reaction zone. In the second reaction zone the contact material and associated carbon are contacted with an oxygen-containing gas at a temperature and in a carbon to oxygen ratio such that carbon is converted to a gas consisting principally of carbon monoxide. The second reaction zone preferably is operated at a relatively high temperature to favor the formation of carbon monoxide, and the contact material thus is heated to a temperature substantially higher than that required in the first reaction zone. The heated contact material is continuously withdrawn from the second reaction zone and recycled to the first reaction zone for repassage therethrough, in order to supply contact material to the first reaction zone and in order to supply at least a substantial part of the endothermic heat of reaction to the first reaction zone. The gas products of both reaction zones are combined as the product of conversion of the hydrocarbon.

The reaction conditions imposed on the first reaction zone and the relative proportions of reactants charged thereto are controlled primarily with the purpose of maintaining the carbon monoxide to carbon dioxide ratio in the product gas at a high value and with the purpose of operating at as low an operating temperature as is practicable, while minimizing the steam requirement of the process. These conditions result in the conversion of a portion of the hydrocarbon reactant to carbon which is deposited in the reaction zone. While the production of carbon, as an end product, is not in itself a desired object of the present process, the improved process has the advantage of the beneficial results of the operating conditions which produce carbon and the carbon formed is utilized to produce additional product gas and to supply heat of reaction. Thus the operating conditions and the proportions of reactants which characterize the operation in the first reaction zone may be designated simply as those which produce carbon in the reaction.

It is believed that the present invention may be best described by reference to the accompanying drawings which show the inventive features of the present invention as applied, for example, to the synthesis of organic compounds.

Fig. 1 of the drawings is a diagrammatic illustration in elevation, partly in cross-section, of an arrangement of apparatus for the synthesis of organic compounds embodying the present invention, having as its principal pieces of apparatus a reforming chamber 7, a partial combustion chamber 18, a synthesis reaction chamber 31, and a product recovery unit 38. Fig. 2 of the drawings is an elevational view diagrammatically illustrating a modification of the reforming operation of the present invention.

In Fig. 1 of the drawing methane, or a methane-containing gas, from any suitable source, such as natural gas, and preferably after the removal of $H_2S$ by conventional methods, is passed under pressure through conduit 4, heat exchanger 12 and conduit 6 to reforming chamber 7. Although methane is referred to specifically as the feed to reforming chamber 7, the use of other normally gaseous hydrocarbons, such as ethane, propane and butane, and normally liquid hydrocarbons, is within the scope of this invention. As will be later pointed out, this invention has particular applicability to the use of hydrocarbons of higher molecular weight than methane. Steam is introduced into conduit 6 for admixture with the methane stream therein and passes together with methane to reforming chamber 7. The mixture of methane and steam passes upward, in the preferred embodiment of this invention, through a mass of finely divided contact material, such as supported or unsupported nickel, under conditions such that the finely divided contact material is suspended in a fluidized pseudo-liquid condition in reforming chamber 7. Gases are passed upward through the mass of contact material at a velocity effective to suspend the catalyst mass in the gas stream. The velocity of the gas stream passing through the reaction zone, however, is sufficiently low to maintain the contact mass in a so-called dense fluidized pseudo-liquid condition. In this condition the contact mass may be said to be suspended in the gas stream, but not entrained therein in the sense that there is movement of the contact mass as such in the direction of flow of the gas stream. It is preferred, however, to maintain the upward velocity of the gas stream sufficiently high to assure a highly turbulent condition of the fluidized contact mass in which the solid particles circulate at a high rate within the pseudo-liquid mass.

In the embodiment shown in Fig. 1, the contact mass of finely divided solid particles is maintained in a reactor substantially larger than the volume occupied by the contact mass in the fluidized condition. In this manner all but a minor proportion of the catalyst mass is contained in a dense fluidized pseudo-liquid mass which may be designated as a dense phase. The dense phase of contact material occupies the lower part of reactor 7 while that part of the reactor above the dense phase is occupied by a mixture of gases and finely divided contact material in which the concentration of contact material is much lower, and of a different order of magnitude, than the concentration of the contact material in the dense phase. This phase in the upper portion of reactor 7 may be designated as the diffuse phase and may be considered a disengaging zone in which the solids lifted above the dense phase by the gas stream are disengaged therefrom and returned to the dense phase to the extent that such solids are present in the diffuse phase in excess of the carrying capacity of the gas stream at the linear velocity thereof. In the dense phase, the concentration of the contact material in the gas stream varies from a maximum at the gas inlet to a minimum in the upper part of this phase. Likewise, the concentration of the contact material in the diffuse phase varies from a maximum near the dense phase to a minimum at the upper part of reactor 7. Between the dense phase of high average concentration and the diffuse phase of low average concentration of solids, there is a relatively narrow zone in which the concentration of solids in the gas stream changes in a short space from the high concentration of the dense phase to the low concentration of the diffuse phase. This zone has the appearance of an interface between two visually distinct phases and is designated by numeral 8.

Such operation ordinarily involves contact material of such size and gas velocities that a relatively small proportion of the fluidized contact material is carried away by entrainment and it is necessary to provide means within the reactor, such as a cyclone separator 9 and attached standpipe, for separating such entrained contact material and returning it into the dense phase, or to provide externally of the reactor means, such as a cyclone separator and standpipe terminating in the reactor (not shown), to separate entrained contact material from the gas stream and return it to the reactor, or otherwise recover contact material from the product gas stream in conduit 11. When the contact material is permitted to pass out of the reactor by entrainment in the gas stream, it is necessary to return such contact material to the reactor or replace it with fresh or additional contact material, in order to maintain the desired volume of fluidized contact mass in reactor 7.

To maintain the fluidized condition, the contact material is employed in a fine state of subdivision. Preferably, the powdered contact material initially contains no more than a minor proportion by weight of material whose particle size is greater than 250 microns. Preferably, also the greater proportion of the contact material comprises material whose particle size is smaller than 100 microns, including at least 25 weight per cent of the material of a particle size smaller than 40 microns. The specific fineness of contact material required for any operation is determined by such factors as pressure and specific gravity of the particles. When this material is subjected to an upward linear gas velocity between about 0.1 and about 5 or 6 feet per second, the particles form the so-called pseudo-liquid fluidized condition. The specific density or concentration of the solids in the dense phase will depend upon the particle density and upon the linear gas velocity. Generally, the density of the dense phase is between about 15 and about 120 pounds per cubic foot of gas, the lower densities prevailing with the higher velocities and with lower particle densities, and the higher densities prevailing with the lower velocities and with higher particle density. For a comparison, the settled density of the contact mass is usually about 1.5 to 3 times the density of the dense phase.

According to the present invention, reactor 7 is maintained under operating conditions such that methane is reacted with steam to produce hydrogen, carbon monoxide and a minimum amount of carbon dioxide accompanied by a substantial deposition of carbon upon the contact material. Under the operating conditions preferred for chamber 7 at least 0.1 pound of carbon is deposited on each pound of contact material charged to reactor 7. A temperature between about 1000 and about 1800° F. is employed in reactor 7. Temperatures below about 1400 or 1300° F. are preferred; the temperature being chosen with regard to the reaction rate required to obtain an efficient yield of hydrogen and carbon monoxide and a minimum yield of carbon dioxide. The steam to methane ratio is maintained at a minimum, usually about one mol of steam per mol of methane or less, whereby a substantial deposition of carbon is obtained. If carbon dioxide is added to the reaction mixture and if a relatively low temperature within the operating range is used, larger proportions of steam with respect to methane may be used. For example, operating at a temperature of about 1150° F. and a mol ratio of carbon dioxide to methane above about 0.5:1, a mol ratio of steam to methane of about 1.5:1 may be employed. These conditions result in a hydrogen to carbon monoxide mol ratio in the product gas of about 3:1 or less. Carbon dioxide may be introduced into the system through conduit 6 along with steam, or into conduit 4 from conduit 42 to be discussed more fully hereinafter. A residence time between about 5 and about 60 seconds is appropriate. A relatively long residence time of the reactants within reactor 7 is not detrimental to the process even though carbon formation is increased and is advantageous since the yield of desired product is increased.

The composition of the contact material influences the tendency for the deposition of carbon and it is, therefore, permissible to select a contact material which favors the formation of carbon as well as the formation of the desired end products. Such contact material comprises a highly active nickel catalyst with less than about 50 per cent supporting or diluting materials, such as alumina or silica. Cobalt and iron in active forms may also be used as contact materials. Various other contact materials may be used. For example, finely divided coal or coke can be used as the contact material without departing from the scope of this invention.

According to a modification of this invention, ethane and propane are used as the feed constituents to reforming zone 7; thus ethane and propane may be used in combination with methane or natural gas, or gases containing a relatively high percentage of ethane and propane may be used. It is permissible in the present process to use large proportions of ethane, propane and butane even though these hydrocarbons have a much greater tendency for the deposition of carbon than methane since carbon deposition is advantageous to the process. The use of higher molecular weight hydrocarbons is a means for lowering the ratio of hydrogen to carbon monoxide in the product gas when that is desired.

This process is applicable to normally liquid hydrocarbons, especially low grade crude oils, such as Santa Maria crude which contains a very high sulfur content. The high sulfur content of some crudes make their conversion to motor fuels by conventional methods uneconomical. A Santa Maria crude may be economically converted to valuable motor fuel by vaporizing the crude, reforming the vapors to hydrogen and carbon monoxide according to this invention, and subsequently converting hydrogen and carbon monoxide to valuable liquid organic compounds useful as motor fuel. Sulfur of the crude is converted to $H_2S$ at the reforming conditions and may be removed from the reforming product by conventional scrubbing methods known to those skilled in the art.

In view of the preceding discussion the reforming reaction is effected in reaction chamber 7 under conditions of operation, such as temperature, feed composition, catalyst, residence time of reactants, etc., such that carbon deposition is favored in order to obtain the beneficial results of these conditions, such as a high carbon monoxide to carbon dioxide ratio, minimum steam requirements, high thermal efficiency, low fuel costs, flexibility of operation, etc. In general, relatively low temperatures within the aforementioned range favor carbon formation when relatively low ratios of carbon dioxide and/or steam to methane are employed.

Typical equations for the reactions effected in reforming chamber 7 are shown below:

(1) $H_2O + CH_4 \rightarrow CO + 3H_2$
(2) $CO_2 + CH_4 \rightarrow 2H_2 + 2CO$
(3) $CO + H_2O \rightarrow H_2 + CO_2$
(4) $2CO \rightarrow CO_2 + C$
(5) $CH_4 \rightarrow 2H_2 + C$
(6) $CH_4 + 2H_2O \rightarrow 4H_2 + CO_2$ An effluent is removed from reforming chamber 7 through conduit 11. Generally, the mol ratio of hydrogen to carbon monoxide in the effluent from reforming chamber 7 is between about 1:1 and about 3:1. This effluent also contains carbon dioxide, steam, and unreacted methane.

Contact material containing carbon is removed from reforming chamber 7 through conduit or standpipe 13 and is introduced into conduit 16 through which relatively pure oxygen or an oxygen-containing gas is passed. The contact material is suspended in the oxygen-containing gas stream in conduit 16 and is passed to partial combustion chamber 18 in which carbon is reacted with oxygen under conditions to produce carbon monoxide accompanied by the liberation of heat. It is within the scope of this invention to transfer contact material from standpipe 13 to combustion chamber 18 with a relatively non-reactive or substantially inert gas, such as steam or methane, and separately introduce the oxygen into combustion chamber 18. The contact material may also be passed directly to combustion chamber 18 by means of a standpipe, Fuller Kinyon pump, or the like.

Any conventional means known to those skilled in the art, such as a standpipe, Fuller Kinyon pump or pressured hoppers, may be used to transfer contact material from reforming chamber 7 to partial combustion chamber 18 without departing from the scope of this invention. An aerating or stripping gas, such as steam or methane, may be introduced into standpipe 13 through inlet conduit 14. The aerating gas maintains the contact material in standpipe 13 in a fluidized or aerated condition which allows free flow of the contact material downward through standpipe 13 by virtue of its weight in the standpipe which must be sufficient to overcome the pressure drop due to friction and the differences in pressures in vessels 7 and 13. In some circumstances the aerating gas may be used to purge the contact material of water vapor and carbon dioxide and strip the contact material of volatilizable compounds. Although relatively pure oxygen is preferred as the oxidizing agent for the reaction effected in combustion chamber 18 to avoid contaminating the product gas and to reduce heat losses, enriched air may be used when purification of the gas product is unnecessary or is not a problem. Steam may be used together with oxygen to convert a part of the carbon to hydrogen and carbon monoxide, if desired.

Oxygen-containing gas from conduit 16 is passed upward through combustion chamber 18 through a mass of finely divided contact material at a velocity sufficient to suspend the mass in a pseudo-liquid condition similar to that condition described with reference to reforming chamber 7. Preferably, the linear velocity of the gas stream passing upward through the contact mass in combustion chamber 18 is sufficient to maintain the particles of contact material in a high state of turbulence causing circulation throughout the dense phase. The velocity of the gaseous stream is preferably sufficiently low as to not entrain more than a minor proportion of the contact material in the effluent from chamber 18. As in reforming chamber 7, a lower dense phase and an upper dilute phase with an interface 19 is maintained in combustion chamber 18. To remove any entrained contact material a cyclone separator (not shown), such as the cyclone separator 9 of reforming chamber 7, may be positioned within combustion chamber 18, or the gaseous effluent from chamber 18 may be passed to the upper portion of chamber 7 through conduits 20 and 21 whereby entrained material is separated in cyclone separator 9.

Appropriate reaction conditions are maintained in combustion chamber 18 to oxidize the carbon on the contact material to produce carbon monoxide. Generally, a reaction temperature between about 1200 and about 2000° F. is used. A pressure corresponding to the pressure in reforming chamber 7 may be employed. Conveniently, the pressure in combustion chamber 18 is in excess of that required to overcome the pressure drop necessary to transfer contact material from chamber 18 to chamber 7, which will be discussed more fully hereinafter. About 1 mol of oxygen per mol of carbon is introduced into combustion chamber 18. On the basis of pounds of contact material transferred from chamber 7 to chamber 18, about 0.001 to about 0.01 mol of oxygen per pound of catalyst is employed. At the preferred operating conditions of the system, between about 0.002 and about 0.008 mol of oxygen per pound of contact material is used. Since the temperature of chamber 18 is a function of the oxygen to carbon ratio, this ratio is adjusted within the above limits for any given circulation rate of contact material between reforming chamber 7 and combustion chamber 18 to convert carbon to carbon monoxide and to provide sufficient heat for the endothermic heat being effected in reforming chamber 7. The heated contact material is removed from combustion chamber 18 through a conventional standpipe 22 and is introduced into conduit 6 by means of which it is passed to reforming chamber 7. In reforming chamber 7, the heated contact material gives up its sensible heat.

An aerating or stripping gas may be introduced into standpipe 22 through conduit 23. Such aerating or stripping gas may conveniently comprise steam, methane or carbon dioxide.

The heat requirement of the endothermic reforming reaction effected in chamber 7 is supplied from the sensible heat of the contact material transferred from combustion chamber 18. Therefore, the temperature of chamber 18 will always be above the temperature of chamber 7 and, from the standpoint of heat transfer purposes and quantity of contact material transferred, the temperature difference should be at least 200° F. In case sufficient heat can not be obtained by the oxidation of carbon on the contact material for the partial combustion reaction and the reforming reaction, additional carbon in the form of coal or coke may be introduced into chamber 18 through conduits 16 and 24 where it is burned. Also methane may be introduced into chamber 18 through conduit 26. Burning of methane and/or coal in chamber 18 provides additional heat for heating the contact material to the desired temperature level. Preferably, the oxygen introduced through conduit 16 is preheated prior to entry into chamber 18 in order to aid in obtaining a relatively high temperature therein. Preheating of the oxygen may be conveniently achieved by passing a portion or all of the oxygen in indirect heat exchange with the effluent in conduit 11 by means of conduit 17 and heat exchanger 12.

In the operation of units 7 and 18, a ratio of oxygen to contact material introduced in chamber 18 and a circulation rate between chambers 7 and 18 is chosen to maintain the desired temperature level and to supply the endothermic heat of reaction in reforming chamber 7. Since the oxygen requirements will vary within relatively narrow limits, the temperature control of chamber 7 may be effected almost entirely by the control of the quantity of contact material passed through standpipes 13 and 22 by means of suitable flow control valves.

In the preferred method of operation, combustion chamber 18 is operated at a pressure in excess of the pressure in reforming chamber 7. In this manner a relatively short standpipe 22 is sufficient to pass the contact material from combustion chamber 18 to reforming chamber 7. The use of a short standpipe at this point is desirable because it reduces the mechanical difficulty of transferring the hot contact material. To pass the contact material from reforming chamber 7 to combustion chamber 18 under such conditions, a longer standpipe 13 is required in order to overcome both the friction and the increased pressure existing in chamber 18.

In a modification of the present invention, hot contact material may be transferred to chamber 7 by means of entrainment in steam alone and the methane introduced separately into chamber 7 through conduit 25. By this method the hot contact material may be mixed with water whereby the water is converted to steam and the resulting mixture of steam and contact material is passed to chamber 7, such as through conduit 6.

A reaction effluent comprising carbon monoxide and small proportions of carbon dioxide and steam is removed from combustion chamber 18 through conduit 21 and this effluent is combined with the effluent from reforming chamber 7 in conduit 11 as the product of the gas making process. The combined streams from chambers 18 and 7 which may contain entrained contact material are passed through a conventional heat exchanger 12, as previously discussed, for preheating the hydrocarbon and oxygen feed streams in conduits 4 and 17, respectively. After heat exchange in heat exchanger 12 the effluent is cooled to a temperature below about 1000° F. and is passed through conduit 7 to a second cooler 28. Cooler 28 comprises a conventional direct or indirect cooling means for cooling the effluent to a temperature below about 600° F. As an example, the gases may be scrubbed with a liquid medium, such as water, which cools the effluent at the existing pressure to the desired temperature and simultaneously removes any entrained contact material which still remains therein. If a scrubber is used to cool the effluent, the contact material is removed from the scrubbing medium by settling or the like and subsequently returned to chamber 18 or chamber 7 by means not shown as a slurry or as any finely divided material.

In accordance with one embodiment of this invention, the cooled reaction effluent is passed from cooler 28 through conduit 29 to a conventional synthesis reactor 31 for the conversion of the hydrogen and carbon oxides in the gas stream to normally liquid organic compounds for use as motor fuel, solvents, and chemical reagents. As shown, reactor 31 is a fluid-bed reactor with a lower dense phase of finely divided catalyst and an upper dilute phase with an interface 32 between such phases. Synthesis reactor 31 may comprise any of several types of conventional reaction chamber, either fixed bed or fluid bed reaction units, without departing from the scope of this invention. Synthesis reactor 31 may comprise a plurality of reactors in series or in parallel. Since the synthesis reaction for the conversion of hydrogen and carbon monoxide to organic compounds is exothermic, a conventional cooler 36 is provided for cooling finely divided catalyst removed from reactor 31 through conduit 34. The catalyst is cooled in cooler 36 to a temperature at least 200° F. below the reaction temperature of reactor 31. Cooled catalyst is recycled to reactor 31 through conduit 29. The quantity and temperature of circulated catalyst is regulated such that adequate and positive control of the temperature of reactor 31 is maintained by means of cooler 36. Cooler 36 can be omitted if desired, and cooling effected by other methods, such as direct injection of a cooling medium into reactor 31.

Gases comprising hydrogen and carbon monoxide in conduit 29 are passed through synthesis reactor 31 in contact with a suitable hydrogenation catalyst, such as iron, or other metal or metal oxide of group VIII of the periodic table.

The temperature of reaction in synthesis reactor 31 is maintained between about 300 and about 700° F. and a pressure is maintained between about atmospheric and about 500 pounds per square inch gage, preferably between about 100 and about 300 pounds per square inch gage. When employing an iron or iron oxide catalyst in finely divided form, a temperature between about 450 and 650° F. is appropriate. When employing a cobalt catalyst in finely divided form, a temperature below about 450° F. is employed. Sufficient contact time of reactants and reaction products with the catalyst material is afforded in the dense phase of reactor 31 to form the desired products of the process. Generally, a contact time of gases with catalyst between about 2 and about 20 seconds is appropriate.

During the synthesis reaction, carbonaceous deposits form upon the catalyst and in the case of reduced metal catalysts the catalyst becomes partially oxidized. As a result of the carbonaceous deposits and partial oxidation of the reduced metals, it becomes necessary to revivify the catalyst to restore its activity. Revivification may be accomplished by removing the catalyst through conduit or standpipe 37 and passing the catalytic material to conventional oxidation and/or reduction chambers (not shown) in which the carbonaceous deposits are removed by burning and the oxidized catalyst is reduced. Oxidation of the spent catalyst is effected at elevated temperatures with oxygen, and reduction of the partially oxidized catalyst is effected at elevated temperatures with hydrogen. The revivified catalyst is returned to reactor 31 by means not shown.

A reaction effluent comprising hydrocarbons, oxygenated organic compounds, steam, carbon dioxide, and unreacted reactants including some methane from the synthesis gas is removed from reactor 31 through conduit 33 and passed to a condensation and recovery unit 38. In case the effluent contains entrained catalyst, a conventional solids separator (not shown), such as a cyclone separator, Cottrell precipitator, or liquid scrubbing chamber, may be provided for removal of the entrained catalyst. The recovered entrained catalyst is then returned to reactor 31. Recovery unit 38 comprises conventional recovery equipment, such as condensers, accumulators, fractionators, and extractors, together with auxiliary equipment necessary for their operation known to those skilled in the art. The temperature of the effluent is usually reduced below about 300° F. in recovery unit 38 during the recovery of the products of the process. Water is removed from recovery unit 38 through conduit 39. Since the water may contain considerable amounts of soluble oxygenated organic compounds, the water may be passed to conventional recovery equipment (not shown) for removal of the oxygenated organic compounds therefrom. Organic products of the process, including normally liquid hydrocarbons, are removed from recovery unit 38 through conduit 41. Normally gaseous components of the synthesis reaction effluent are removed from recovery unit 38 through conduit 42. These normally gaseous components comprising unreacted hydrogen and carbon monoxide, carbon dioxide, methane and, when air is used as a source of oxygen in conduit 16, nitrogen will also be present. These gases may be recycled to conduit 4 through conduit 42 as shown to supplement the feed to the reforming chamber 7. The carbon dioxide and methane in the recycle gases are converted to hydrogen and carbon monoxide in reforming chamber 7. When it is desirable to recycle only carbon dioxide and/or when it is desirable to prevent the buildup of nitrogen in the system, a portion or all of the gas stream in conduit 42 is passed to a scrubbing chamber 44 through conduit 43. Scrubbing chamber 44 comprises a conventional carbon dioxide scrubbing chamber in which the gaseous stream is scrubbed with an amine solution to remove the carbon dioxide. Gaseous components, including methane and nitrogen, are removed through conduit 46 and may be used as fuel or vented to the atmosphere. The scrubbing medium is stripped of carbon dioxide and the carbon dioxide is returned to conduit 42 through conduit 47. The carbon dioxide is then recycled to conduit 4 as previously discussed. Recycling of the gaseous components from reactor 31 is especially desirable when using an iron synthesis catalyst since the effluent in such case will contain relatively high proportions of carbon dioxide, usually above 20 per cent by volume of carbon dioxide and as much as 50 volume per cent. The carbon dioxide formed can be utilized to supplement the steam introduced into reformer unit 7 by recycling through conduit 42.

Since reforming chamber 7, combustion chamber 18, and synthesis reactor 31 may be operated substantially at the same elevated pressure, the recycling of carbon dioxide formed in synthesis unit 31 is economical. A compressor may be provided in conduit 42 for compressing the recycle gases to overcome the pressure drop of the system.

Figure 2 of the drawings is an elevational view of an arrangement of apparatus for a preferred modification of the present invention in which contact material is continuously circulated through reforming zone 62 in the direction of flow of the reactant gases. Since the operating conditions employed in the illustration of the embodiment of Figure 2 are similar to those described and discussed with respect to Figure 1, only a brief discussion of the apparatus of Figure 2 and its operation will be undertaken. Accordingly, methane or other hydrocarbons is passed through conduit 61, heat exchanger 67, to reforming chamber 62. The preheated gases in conduit 61 pick up contact material from standpipe 69 and pass the contact material by entrainment to reforming chamber 62. The gases and contact material are continuously passed upward though reforming chamber 62 into transfer line 63 to a solids separator 64.

The cross-sectional area of reforming chamber 62 and the linear velocity of the gases passing therethrough is such that the contact material is moved in the direction of flow of the gaseous reactants. Preferably, a velocity above about 6 feet per second is employed to carry the contact material with the gases. However, with a relatively small cross-sectional chamber, such as a chamber having less than about 2 inches in diameter, lower velocities may be used. It is preferred that the velocity and the cross-sectional area of chamber 62 be such that the particles of contact material do not circulate materially within chamber 62 but continuously move in the direction of flow of the gaseous reactants. The operation may be such, however, that circulation of the contact material within chamber 62 is permitted within a relatively short longitudinal distance while the entire mass of contact material moves in the direction of flow of the gases. Conduits 61 and 63 should be of substantially less cross-sectional area than vertical chamber 62 in order to prevent settling of the contact material in the horizontal sections thereof. In other words, the velocities in conduits 61 and 63 should be substantially greater than the velocity of the gases within chamber 62.

The operating conditions employed within chamber 62 are substantially the same as those with regard to reforming chamber 7 of Figure 1.

Contact material and gases are separated from each other in separator 64. Separator 64 may comprise an enlarged settling zone, a cyclone separator or other like means known to those skilled in the art for separating solids from gases. The separated solids containing deposited carbon thereon settle to the lower portion of separator 64 and are passed therefrom into an elongated partial combustion chamber 68. The contact material passes downward in combustion chamber 68 countercurrently to an upward flowing stream of oxygen or oxygen-containing gas introduced therein through conduits 71 and 72. It is preferred to introduce the oxygen-containing gas at a plurality of spaced points longitudinally along combustion chamber 68 to aid in the control of the partial combustion process and to obtain a relatively uniform temperature therein without the formation of hot spots, or local overheating. The conditions of partial combustion are substantially the same as those described with regard to partial combustion chamber 18 of Figure 1. Steam may also be introduced into partial combustion chamber 68 through conduit 73. The steam and carbon are converted to hydrogen and carbon monoxide. Gases issuing from the upper portion of partial combustion chamber 68 contain carbon monoxide and, when steam is introduced therein through conduit 73, these gases will also contain hydrogen. The gases from chamber 68 are admixed with the gases from reforming chamber 62 and pass from separator 64 through conduit 66 to heat exchanger 67. The gases contain hydrogen and carbon monoxide in a mol ratio between about 1:1 and about 3:1, and may be used as a feed gas for the synthesis of organic compounds as described with regard to Figure 1.

Contact material having at least a portion of the carbon removed therefrom is passed to combustion chamber 68 by means of stand pipe 69 and conduit 61 for recirculation through reforming chamber 62. The sensible heat of the contact material from combustion chamber 68 supplies the necessary endothermic heat of reaction for the reforming reaction being effected in chamber 62. In some instances it may be necessary to cool the heated contact material passing from a combustion chamber 68 to reforming chamber 62. The requirement for cooling will arise when the temperature with relation to the particular quantity of contact material passing between the two zones is above that required to give the desired reforming temperature. Cooling may be effected by indirect or direct means, such as a conventional catalyst cooler (not shown) imposed in standpipe 69 in which indirect heat exchange is made between a suitable cooling medium and contact material, or by direct injection of a relatively cold reactant, water, or saturated steam into the contact material in standpipe 69 or conduit 61. The carbon monoxide produced by the partial combustion of the carbon in combustion chamber 68 supplements the carbon monoxide content of the product gases in conduit 66.

As used herein, the term "fluidized condition" refers to the condition of the contact material both when it forms a fluid bed or dense phase as described in Figure 1 and when it is entrained in the gaseous mixture and passes through the reaction zone therewith as described with regard to Figure 2.

Various coolers, condensers, pumps, valves and heat exchangers have been omitted from the drawings as a matter of convenience and clarity and their use and location will become apparent to those skilled in the art without departing from the scope of this invention. Various modifications of the invention and arrangement of the apparatus will also become apparent to those skilled in the art without departing from the scope of this invention.

We claim:

1. A process for producing hydrogen and carbon monoxide as the principal products which comprises reacting steam and a hydrocarbon in a first reaction zone at a temperature below 1300° F. in the presence of a finely divided contact material under conditions such that hydrogen and carbon monoxide are produced, the steam and hydrocarbon being introduced into the first reaction zone in a relatively low mol ratio in relation to the temperature employed such that the mol ratio corresponds to that of the mol ratio of steam to methane not greater than about 1:1 and such that a substantial portion of the hydrocarbon is converted to carbon which is deposited in the first reaction zone in association with the finely divided contact material, withdrawing product gas and contact material and associated carbon from the first reaction zone, introducing the withdrawn contact material and associated carbon into a separate second reaction zone, simultaneously with the reaction in said first reaction zone contacting carbon and contact material in the second reaction zone with oxygen at a higher temperature than said first reaction zone and in a relatively low ratio of oxygen to carbon such that carbon is exothermically converted to gas comprising a substantial proportion of carbon monoxide whereby the mass of solids in the second reaction zone is heated to a temperature substantially higher than the temperature maintained in the first reaction zone, withdrawing heated contact material and product gas from the second reaction zone, combining product gas from the second reaction zone with product gas from the first reaction zone, reintroducing into the first reaction zone heated contact material withdrawn from the second reaction zone and cyclically circulating contact material between said first and second reaction zones in the above manner whereby carbon deposited in the first reaction zone is converted to carbon monoxide in the second reaction zone and at least a portion of the heat of reaction required in the first reaction zone is supplied thereto by the passage of the hot contact material from the second reaction zone to the first reaction zone.

2. The process of claim 1 in which said contact material comprises nickel.

3. The process of claim 1 in which said contact material comprises coal.

4. The process of claim 1 in which said contact material comprises iron.

5. A process for the production of a gaseous mixture comprising hydrogen and carbon monoxide in relatively large proportions which comprises introducing steam and a hydrocarbon into a first reaction zone, passing steam and normally gaseous hydrocarbons upward through a mass of finely divided contact material in said first reaction zone at a linear gas velocity sufficient to suspend said contact material in a fluidized condition under conditions of temperature below 1300° F. such that hydrogen and carbon monoxide are produced and such that carbon is produced in substantial amounts, controlling the mol ratios of reactants introduced into said first reaction zone in relation to the temperature employed such that the mol ratio corresponds to that of the mol ratio of steam to methane not greater than about 1:1, removing from said first reaction zone contact material associated with substantial amounts of carbon and simultaneously with the reaction in said first reaction zone passing same to a second reaction zone, passing oxygen upward through said contact material in said second reaction zone at a linear gas velocity sufficient to suspend the contact material in a fluidized condition under exothermic conditions such that carbon monoxide is produced as the principal reaction between the oxygen and carbon, maintaining a temperature in said second reaction zone at least 200° F. above the temperature of said first reaction zone, removing hot contact material from said second reaction zone and passing same to said first reaction zone to supply endothermic heat of reaction to said first reaction zone, and removing effluents from each of said reaction zones and combining same as the product of the process.

6. A process for producing hydrogen and carbon monoxide as the principal products which comprises reacting steam and methane in a first reaction zone in the presence of finely divided contact material at a temperature below 1300° F. to produce hydrogen and carbon monoxide, the steam and methane being introduced into said first reaction zone in a mol ratio less than about 1:1 whereby a substantial portion of the methane is converted to carbon which is deposited in the first reaction zone on the finely divided contact material in a quantity amounting to at least 1% by weight of the contact material, withdrawing product gas and contact material and associated carbon from the first reaction zone, introducing the withdrawn contact material and associated carbon into a second separate reaction zone, simultaneously with the reaction in said first reaction zone contacting carbon and contact material in said second reaction zone with oxygen at a temperature between about 1200 and about 2000° F. and at least 200° F. higher than the temperature of said first reaction zone, the amount of oxygen being introduced into said second reaction zone being between about 0.001 and about 0.01 mol per pound of contact material charged thereto such that carbon is converted to a gas comprising a substantial proportion of carbon monoxide and the contact material in the second reaction zone is heated to a temperature substantially higher than the temperature maintained in the first reaction zone, withdrawing heated contact material and product gas from said second reaction zone, combining product gas from said second reaction zone with product gas from said first reaction zone as the product of the process, reintroducing into said first reaction zone heated contact material withdrawn from said second reaction zone and cyclically circulating contact material between said first and second reaction zones.

7. The process of claim 6 in which the contact material is a nickel catalyst containing less than about 50 per cent supporting material.

CRUZAN ALEXANDER.
GEORGE H. PALMER.

REFERENCES CITED

The following references are of record in the file of this patent:

UNITED STATES PATENTS

| Number | Name | Date |
| --- | --- | --- |
| 1,992,909 | Davis | Feb. 26, 1935 |
| 2,347,682 | Gunness | May 2, 1944 |
| 2,405,395 | Bahlke | Aug. 6, 1946 |
| 2,420,049 | Martin | May 6, 1947 |
| 2,436,938 | Scharmann et al. | Mar. 2, 1948 |
| 2,448,290 | Atwell | Aug. 31, 1948 |
| 2,464,501 | Grahame | Mar. 15, 1949 |